United States Patent [19]

Stacy, Jr.

[11] Patent Number: 4,714,125
[45] Date of Patent: Dec. 22, 1987

[54] SINGLE LATERALLY BENDABLE TRACK SNOWMOBILE

[76] Inventor: Jack C. Stacy, Jr., Rte. 3, Box 107A, Santa Fe, N. Mex. 87501

[21] Appl. No.: 859,381

[22] Filed: May 5, 1986

[51] Int. Cl.$^4$ ............................................. B62D 11/22
[52] U.S. Cl. ..................................... 180/182; 180/190; 180/9.44; 305/35 EB; 305/44
[58] Field of Search ............... 180/182, 184, 185, 186, 180/190, 9.1, 9.44, 9.46; 305/16, 17, 18, 44, 57; 114/270

[56] References Cited

U.S. PATENT DOCUMENTS 1,894,619 1/1933 Knickerbocker ............... 180/190 X
3,517,457 6/1970 Peno ................................. 180/190 X
4,453,611 6/1984 Stacy, Jr. ............................ 180/9.44

FOREIGN PATENT DOCUMENTS 187290 1/1937 Switzerland ..................... 180/190

Primary Examiner—John J. Love
Assistant Examiner—Mitchell J. Hill
Attorney, Agent, or Firm—James E. Snead

[57] ABSTRACT

A vehicle especially adapted for traveling on snow, which has a single endless track made bendable laterally in order to change direction of travel. The vehicle has a main body assembly which is separated and supported above the track by a special suspension arm. A motor is located in the body assembly, and a drive train is connected between the motor and track. The drive train extends through the suspension arm. The steering control system also passes through the suspension arm and causes the track to flex laterally into a curve in a manner which positions the rider over the flotation centerline of the curved track and thereby maintains balance while negotiating turns. One end of the suspension arm is sprung from the track, and the body is sprung from the other end of the suspension arm.

19 Claims, 9 Drawing Figures

SINGLE LATERALLY BENDABLE TRACK SNOWMOBILE

BACKGROUND OF THE INVENTION

Reference is made to my previous U.S. Pat. No. 4,453,611 issued June 12, 1984; and to the art cited therein, for further background of this invention. The present invention provides improvements over the above prior art by the provision of a low profile track assembly which supports a main body by a cantilever suspension arm. One end of the suspension arm is sprung to the rear end of the track assembly, while the other end of the suspension arm is attached to the main body. Power is supplied to the track assembly by a drive train which extends through the suspension arm and to a motor located within the main body. The main body provides a saddle for accommodating one or a plurality of riders. A handle bar support system is pivoted to the main body.

The track flexes laterally into a curve in a manner whereby the center of gravity is maintained at an optimum location so that the rider is positioned over the flotation centerline of the current track, which adds stability while the vehicle is negotiating turns.

SUMMARY OF THE INVENTION

Figure 1:
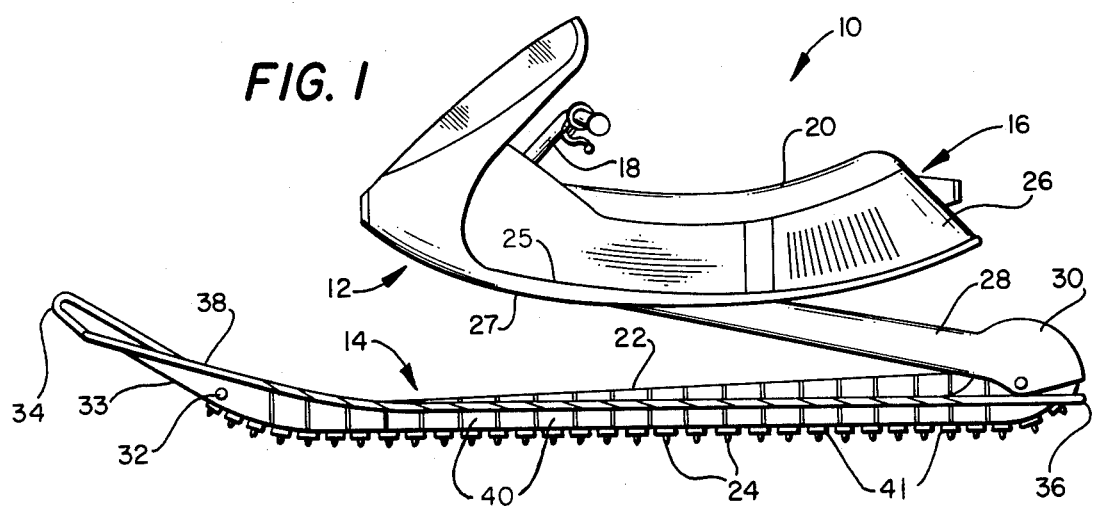
FIG. 1 is a side elevational view of a vehicle made in accordance with the present invention.
Figure 2:
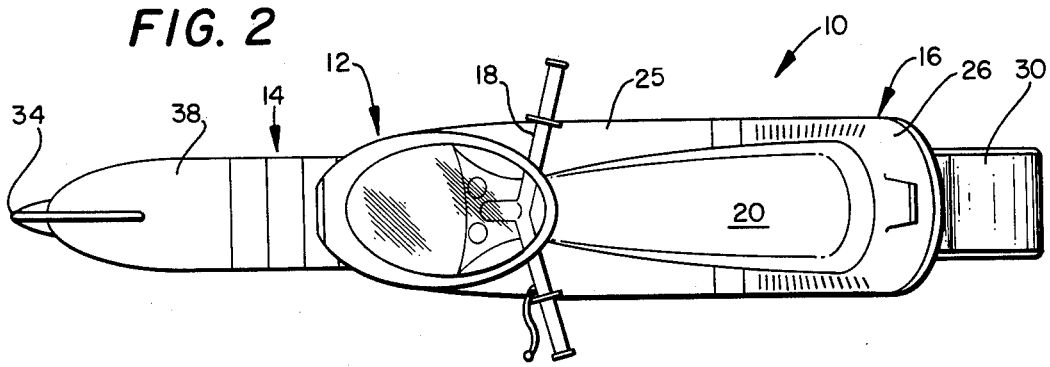
FIG. 2 is a top plan view of the vehicle disclosed in FIG. 1.
Figure 3:
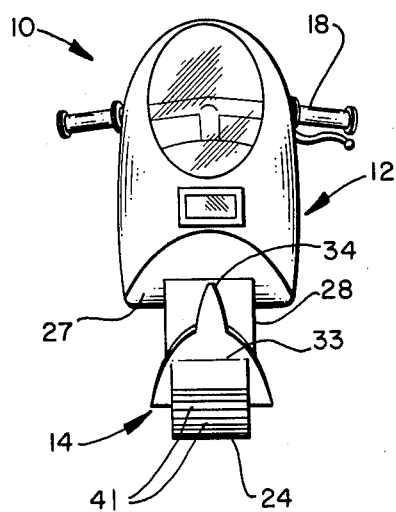
FIG. 3 is a front view of the vehicle seen disclosed in the foregoing figures.
Figure 4:
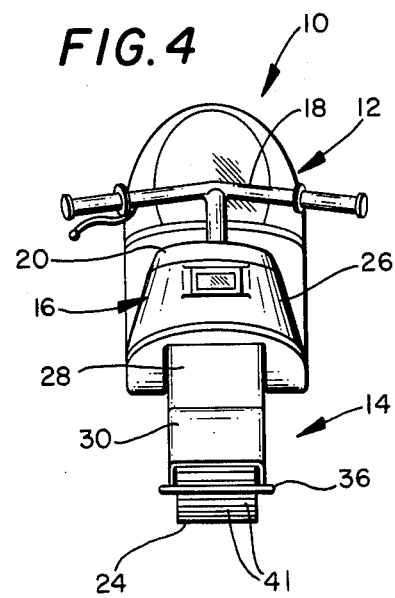
FIG. 4 is a rear view of the vehicle disclosed in the foregoing figures.

A snowmobile type vehicle having a track assembly which includes a narrow, single, oblated, laterally flexible, endless track centrally located and guided about a track guide means. The track assembly supports and propels the vehicle along the surface of the snow. The vehicle of this invention includes a main body having a seat or saddle formed thereon for accommodating one or more riders. The main body is sprung from the track assembly by a spring loaded cantilever arm having spring means at the distal ends thereof. The spring means permits the main body to be resistingly urged toward and away from the track assembly while remaining substantially parallel to the track assembly.

A motor is supported within the main body and is connected to the track assembly by a drive train which extends through the interior of the suspension arm. The main body further includes a steering system in the form of a handle bar connected through the suspension arm and to the track assembly in a manner whereby the endless track of the track assembly is laterally flexed into a curve, whereby the center of gravity of the main body stays above the flotation centerline of the endless track when it is desired to turn the vehicle and change the direction of travel.

The track assembly is a low profile mechanism having a track tunnel formed therethrough, with the tunnel being formed through a plurality of individual, series connected, adjacent segments pivotally attached to one another in a manner to provide for the aforementioned lateral flexing. The endless track is captured respective to the segments and therefore must assume the same radius of curvature presented by the segments.

A primary object of the present invention is the provision of a single track vehicle having a main body assembly separated from and supported above a track assembly by a suspension arm.

Another object of the present invention is the provision of a single track vehicle having a power system and steering control system connected from a main body, through a suspension arm, and to the track means.

A further object of the present invention is the provision of a single track vehicle having a segmented track assembly which is bendable laterally by means of a special push pull linkage so that the impact of the vehicle respective to the terrain is not substantially transmitted into the steering mechanism.

A still further object of the present invention is the provision of a single track vehicle having a main body assembly arranged whereby a special linkage changes the track from a longitudinal into a curved configuration in a manner to keep the center of gravity of the vehicle centered over the flotation centerline of the track.

Another and still further object of the present invention is the provision of a single track vehicle having a main body suspended from a track means by a suspension arm, with the suspension arm being connected to the track means by a spring means which maintains the main body in a substantially level attitude while traversing rough terrain.

These and various other objects and advantages of the invention will become readily apparent to those skilled in the art upon reading the following detailed description and claims and by referring to the accompanying drawings.

The above objects are attained in accordance with the present invention by the provision of a combination of elements which are fabricated in a manner substantially as described in the above abstract and summary.

DETAILED DESCRIPTION OF THE PREFERRED EMBODIMENT

In FIG. 1, together with other figures of the drawings, there is disclosed a single track vehicle 10 made in accordance with the present invention. The vehicle has a main body assembly 12 supported from a track assembly 14. The main body assembly 12 is in the form of a pod-like enclosure 16 within which there is housed various mechanisms, as will be more fully described hereinafter.

Figure 5:
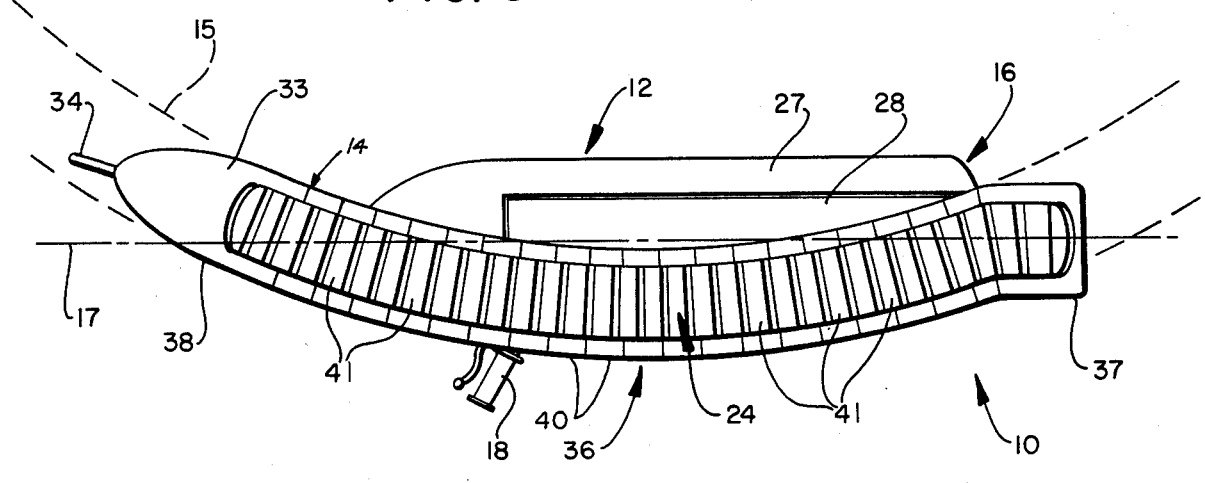
FIG. 5 is a bottom view of the vehicle disclosed in the foregoing figures; with the single track flexed laterally so that the vehicle being illustrated is in a configuration for negotiating a turn.

As seen illustrated in FIG. 5, the track assembly 14 is laterally flexible so that the track curves in a horizontal plane, as seen illustrated at 15, from a straight or longitudinal line, as seen illustrated at 17.

Figure 6:
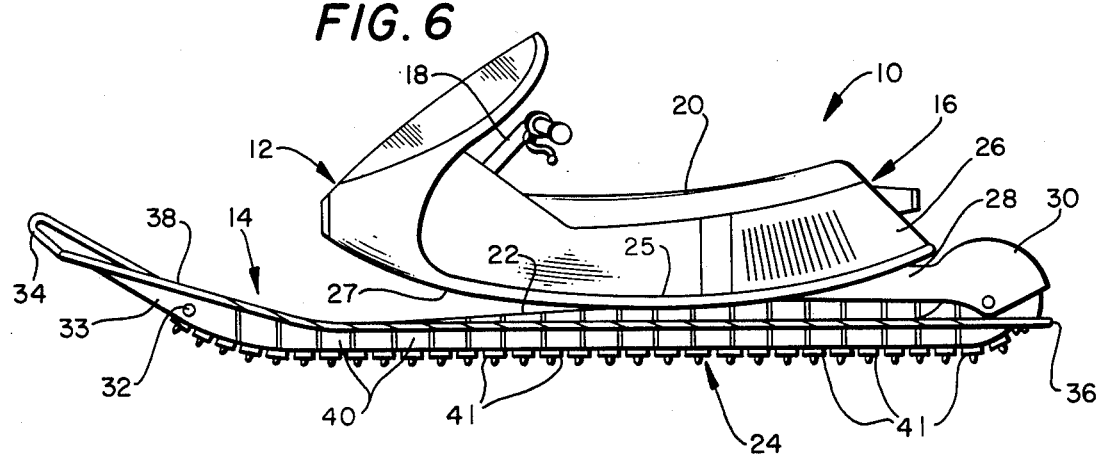
FIG. 6 is a side elevational view, similar to FIG. 1, with the apparatus being shown in an alternate position.
Figure 7:
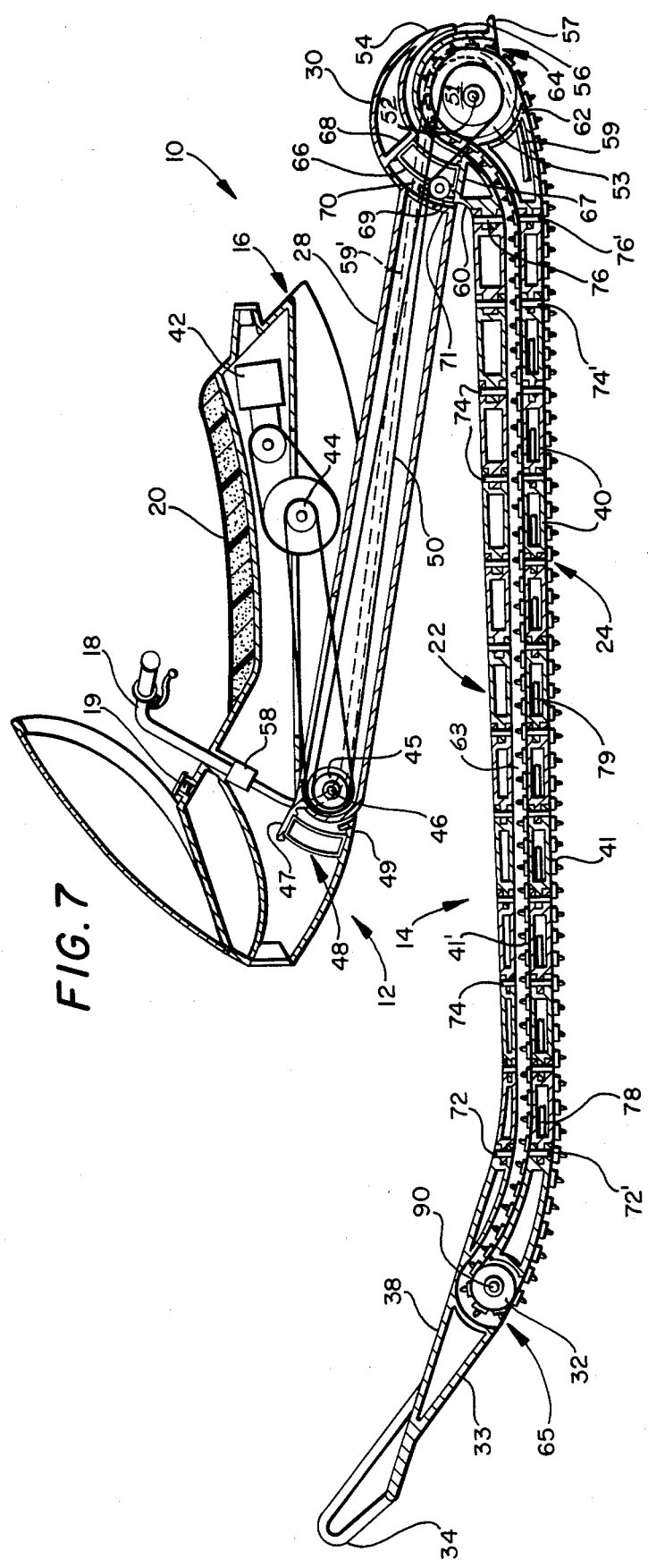
FIG. 7 is an enlarged, longitudinal, part cross-sectional view of the vehicle disclosed in the foregoing figures.

Looking again now to FIG. 1, in conjunction with FIGS. 2–8, the main body assembly includes a steering apparatus operated by handle bars 18. A gas tank 19, more particularly shown in FIG. 7, is provided forwardly of a saddle or seat 20. The seat may accommodate several riders.

A foot pan 25 formed as an integral part of main body assembly 12 provides a foot support surface for riders. The enclosing lower section 27 of enclosure 16 is shown in FIGS. 1 and 6. A motor compartment 26 is formed at the rear end of enclosure 16 thereof.

Main body assembly 12 is sprung from track assembly 14 by means of a suspension arm assembly 28, constructed in accordance with the present invention. Main body assembly 12 is attached to one of the opposed ends 49 of suspension arm 28, while the other end of suspension arm 28 is attached at 30 to the rear marginal end of track assembly 14.

Numeral 33 indicates the front of track assembly 14, while numeral 34 indicates the forwardmost end of the vehicle, and numeral 38 generally illustrates the upper surface of the forward marginal end of track assembly 14.

Track assembly 14 comprises a plurality of the illustrated track segments 40 attached to one another in a manner which will be more fully disclosed hereinafter. Track segments 40 jointly cooperate together in a manner to accommodate an endless belt or track 41 which is captured in supported relationship thereabout.

As best seen illustrated in FIG. 7, the endless belt 41 is suitably connected to be driven by a motor 42. Motor 42 has an output pulley 44 connected to a drive belt idler pulley 45. Shaft 46 rotatably supports the idler pulley 45 as well as provides a pivot by which the main body 16 is pivotally attached to one end 49 of the before mentioned suspension arm 28.

Suspension arm 28 is of hollow construction and includes an extension plate 47 formed thereon which receives a spring assembly 48 thereagainst. The opposed side of the spring assembly bears against the interior of enclosure 16 at the upper end 49 of suspension arm 28 which can be reinforced if desirable. Spring assembly 48 can be a pneumatic body, a rubber member, or a metallic spring arrangement. Accordingly, body assembly 12 can be pivoted in a vertical plane about the shaft 46 while spring assembly 48 urges the body assembly into the illustrated neutral position of FIG. 7.

An endless drive belt or chain 50 is enclosed within suspension arm 28 and is drivingly connected to transmit power between pulleys 45 and 51. Pulley 51 is secured in journaled relationship to track assembly 14 by means of shaft 52. Shaft 52 permits the lower end of suspension arm 28 to be pivoted about shaft 52 respective to track assembly 14.

Suspension arm 28 is attached at 30 to the rear marginal end of track assembly 14 which provides an outer curved wall 54 as shown in FIG. 7. Outer curved wall 54 is concentric and spaced from inner curved wall 56 of track assembly 14. Inner curved wall 56 terminates in a rearwardly directed plate 57 which strengthens the rear part of track assembly 14 and makes it more rigid.

The handle bars 18 are connected to a step-up rotary ratio assembly 58, which rotates a rotary cable assembly 59. A medial length 59' of the rotary cable assembly is housed within the suspension arm 28. It may be understood by those skilled in the art that conventional hydraulic or mechanical steering linkages may be used in place of the steering assembly shown.

A load transfer member 60 is rigidly affixed to the curved housing 56 and is spaced from a complementary contoured guide member 62. The contoured guide member 62, curved member 56, and member 60 jointly cooperate together to provide part of a track tunnel 63 having an entrance 64 and exit 65 for the before mentioned endless track.

Track spring assembly 66 is captured between walls 67, 68, and 69. Numeral 70 illustrates a spring assembly chamber within which the before mentioned spring 66 is captured and stores energy whenever the supsension arm is pivoted about shaft 52 respective to the track assembly. The suspension arm includes a curved end wall 71, of which members 30 and 54 are a continuation, and which is slightly spaced from the before mentioned curved wall 69.

The individual track segments 40 are articulated and thereby move respective to one another by means of pivot pins 72, 72' which are aligned along a common vertical axis for pivoting the forward most section 33 of the track assembly. A plurality of centrally located segments are similarly pivotally connected together by pivot pins 74, 74'; while the rear segment 60 is pinned to the central segments by means of a set of rear pins 76, 76'.

Figure 8:
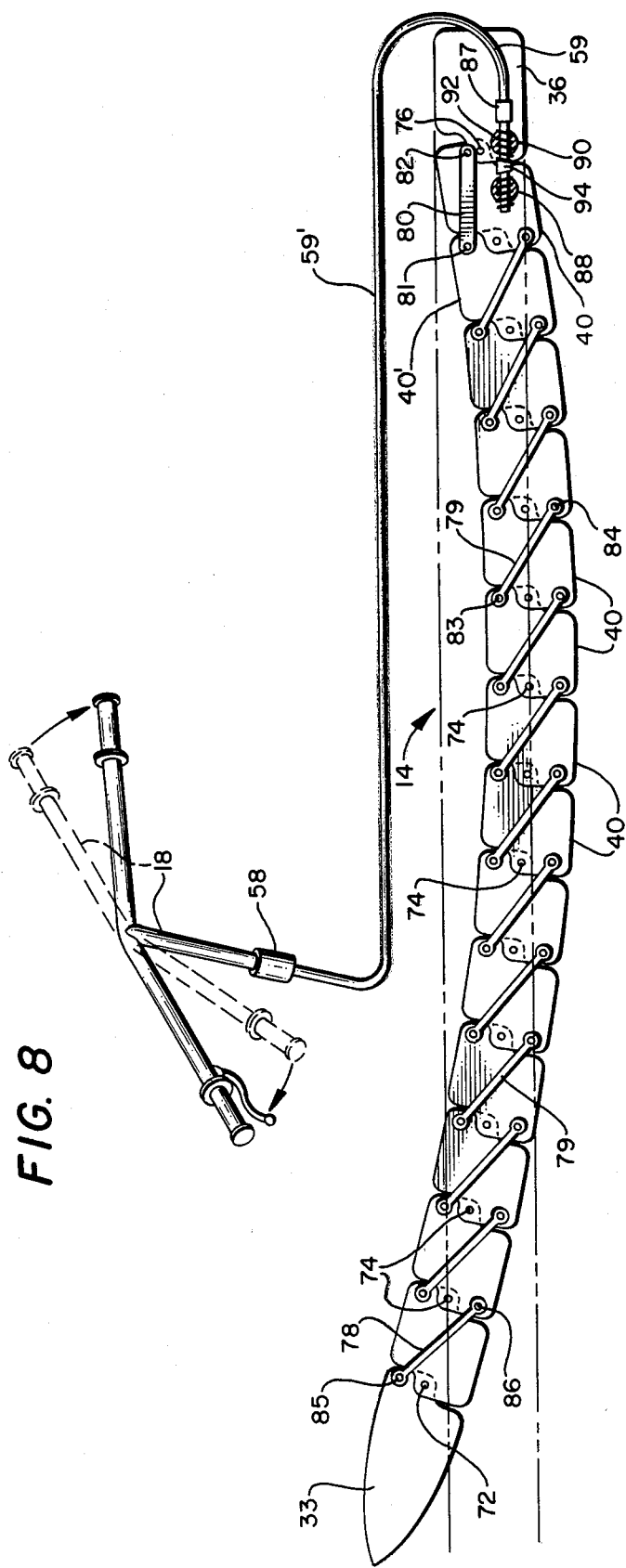
FIG. 8 is a part diagrammatical, part schematical, plan view of part of the apparatus disclosed in the foregoing figures with the track linkage being flexed laterally.

As seen illustrated in the figures of the drawings, and in particular FIGS. 5 and 8, the track segments are moved laterally respective to one another and into the before mentioned curved 15, 17, as seen in FIG. 5, for example. This curved configuration is achieved by a plurality of diagonal linkages pinned to move alternate track segments, with there being a forwardmost linkage 78, intermediate linkage 79, and a rear linkage 80. The rear linkage 80 is pinned to the rear segment 36 and to the subadjacent segment 40' by means of pins 81 and 82. The intermediate links 79 are pinned to alternate segments 40 by means of pins 83 and 84, while the forwardmost linkage 78 is pinned to the forwardmost segment and subadjacent segment by means of pins 85 and 86.

Sockets 88 and 90, respectively, are pivotally attached to the segments 40 and 36, and threaded to receive a threaded member 92 therethrough. The threaded member is provided with left and right hand threads, with a medial part of the illustrated screw being received through a steering bar 94. The threaded member 92 is attached at 87 to the before mentioned rotary cable assembly 59.

In operation, the motor 42 drives sproket 51 by means of the before mentioned drive train comprised of pulleys 44, 45, and 51. This action causes the track 41 to move along its length and thereby move into the entrance 64, through tunnel 63, and back through the exit 65, while supporting the vehicle from the immediate terrain. The vehicle main body assembly 16 is sprung at 48 and 66 so that the body, suspension arm, and track assembly are pivotally connected by pivot connections 46 and 52. Accordingly, as energy is stored and retrieved from springs 48 and 66, the vehicle body maintains proper alignment with respect to the track assembly as it moves towards and away therefrom.

When the handle bar 18 is turned, the gear box 58 rotates threaded member 92 which pivots members 36 and 40 towards and away from one another. Linkages 80, 79 and 78 cause each adjacent segment to be similarly pivoted about the respective pivot pins thereof. This cooperative action changes the configuration of the track from a linear to a curved configuration, as seen illustrated in FIG. 5 of the drawings.

Figure 9:
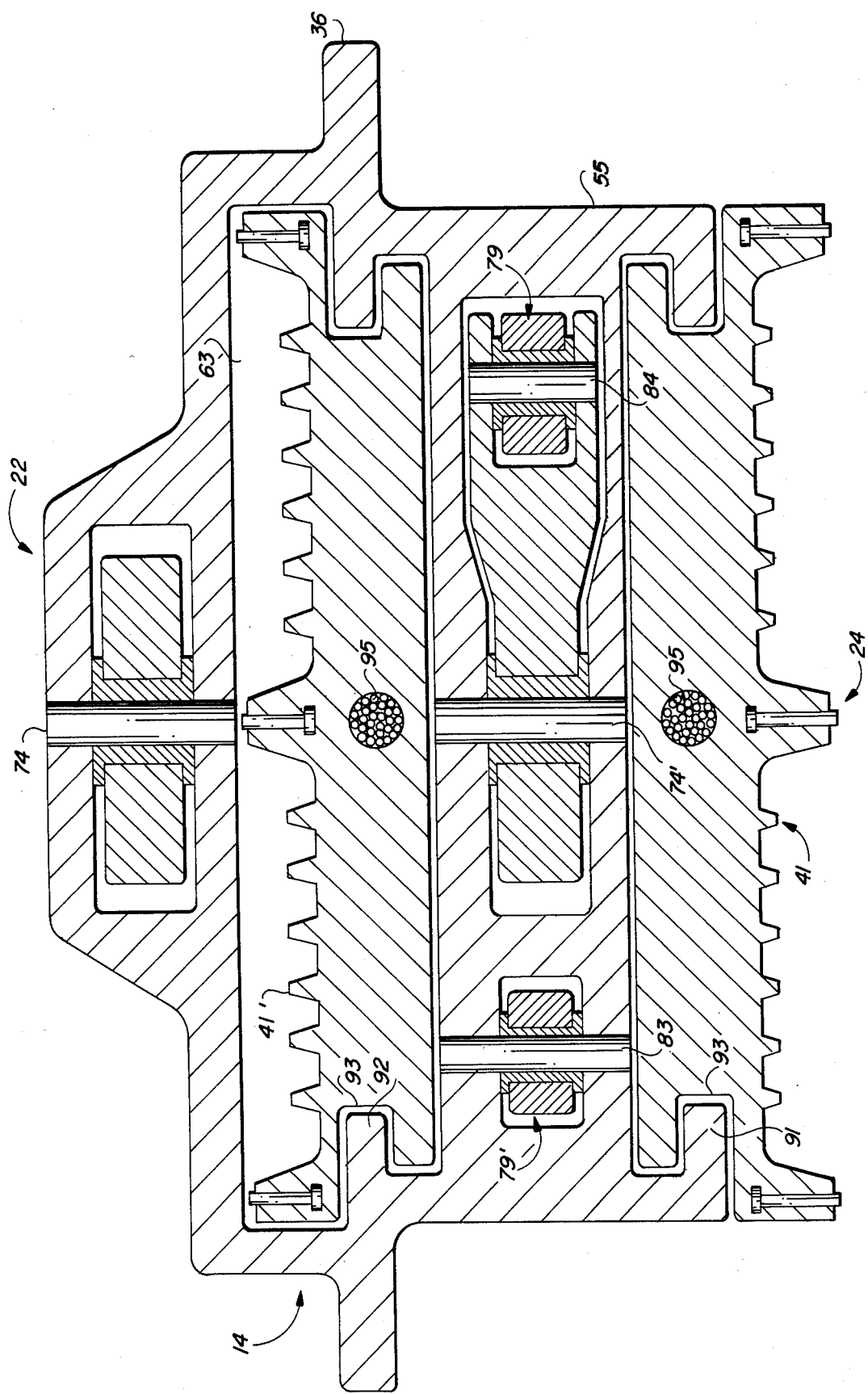
FIG. 9 is a lateral cross-sectional view of the track assembly seen in FIG. 7.

The detailed illustration of FIG. 9 is a cross-sectional representation of track assembly 14. The endless belt 41 is housed within the plurality of segments 40 which form the main housing 55. The housing 55 includes the before mentioned outwardly directed platform 36 formed on opposed sides of the track assembly. The segments of the main housing form the before mentioned tunnel 63 through which the endless track is movably received. The track segments 41 are connected to one another by the illustrated cable 95 which forms the track segments 41 into an endless track assembly.

The main housing 55 includes the illustrated inwardly directed guide extensions 91 at the lower end of the housing, and similar guide extensions 92 at the upper end of the housing. The lower and upper guide extensions 91 and 92 are received within a complementary groove 93 of the endless track assembly 41. The segments 40 of the main housing 55 therefore form a continuous tunnel within which the endless track assembly is received. Upon emerging from tunnel exit 65 track segments 41 engage the ground surface and support the vehicle.

Attention is directed to my previous U.S. Pat. No. 4,453,611 entitled "Terrain Vehicle Having A Single, Laterally Bendable Track" for further background of a single track assembly for a vehicle.

I claim:

1. A single track vehicle having a main body, a track assembly spaced from and underlying said main body, a suspension arm by which the main body is supported in spaced relationship respective to the track assembly;
   said track assembly includes an endless, flexible track means and a track support means; means capturing said track means in an oblated form respective to said track support means for ground supporting the vehicle from the track means;
   means by which one of the suspension arm is connected to the track support means; and,
   the other end of the suspension arm is connected to said main body so that the suspension arm provides the only support for the main body.

2. The vehicle of claim 1 wherein a motor means is mounted respective to said main body; said suspension arm is hollow; a drive train means is connected between said motor means and extends through the interior of said suspension arm and into driving relationship respective to said track means.

3. The vehicle of claim 1 and further including a steering system including handle bars attached to said main body, means extending through the interior of said suspension arm for connecting said handle bars to move said track means laterally and thereby curving said track means laterally for negotiating turns.

4. The vehicle of claim 1 wherein said track means includes a plurality of segments connected together in a manner whereby each segment can be pivoted about a horizontal pivot pin;
   means connecting said segments together whereby pivotal movement of one segment causes an adjacent segment to pivot;
   and means forming a tunnel through said segments through which a marginal length of said endless track means is received.

5. The vehicle of claim 1 wherein said suspension arm is hollow; a motor is mounted to said main body; a drive train is connected between said motor and track means and extends through said suspension arm into driving relationship respective to said track means;
   and further including a steering system supported respective to said main body, means extending through said suspension arm connecting said steering system to said track means in a manner to curve said track means laterally for negotiating turns.

6. The vehicle of claim 1 and further including a steering system including handle bars attached to said main body, means extending through said suspension arm connecting said handle bars to said track means for curving said track means laterally for negotiating turns;
   wherein said track means includes a plurality of segments connected together in a manner whereby one segment can be pivoted about a horizontal pivot pin;
   means connecting said segments together whereby pivotal movement of one segment causes an adjacent segment to pivot;
   and means forming a tunnel through said segments through which said endless track travels.

7. The vehicle of claim 1 wherein a motor is mounted to said main body; a drive train is connected between said motor and extends through said suspension arm and into driving relationship respective to said track means;
   and further including a steering system attached to said main body, means extending through said suspension arm for connecting said steering system to said track means for curving said track means laterally for negotiating turns;
   wherein said track means comprises a plurality of segments connected together in a manner whereby one segment can be pivoted about a horizontal pivot pin; means connecting segments together whereby pivotal movement of one segment causes an adjacent segment to also pivot;
   and means forming a tunnel through said segments through which said endless track can travel.

8. The vehicle of claim 1 wherein said suspension arm includes opposed ends, spring means connecting one said oppossed end of said suspension arm to said track support means.

9. The vehicle of claim 1 wherein spring means are included for attaching one end of said suspension arm to said main body.

10. The vehicle of claim 1 wherein said track support means includes a diagonal linkage having opposed ends, with one end thereof journaled to a forward track segment and the other end thereof journaled to a subadjacent track segment, with the journaled end being located on opposed sides of the longitudinal centerline of the track assembly.

11. A vehicle having a main body to which there is attached a steering means; a suspension arm having opposed ends with one end thereof being attached to said main body at a location near the forward end thereof, said main body includes a seat located rearwardly of the suspension arm attachment;
   a motor supported at the rear end of said main body in underlying relationship respective to the seat;
   a track assembly, including an endless track means captured within a track support means; said track support means is a segmented track body that receives the endless track means in a manner whereby said track means can be moved while supporting the vehicle;

spring means connecting the other end of the suspension arm to a rear segment of the track body means; drive means connected to said motor, extending through said suspension arm, and connected to move endless track means.

12. The vehicle of claim 11 wherein said steering means is supported respective to said main body, means extending through said suspension arm connecting said steering means to said track means in a manner to curve said track means laterally for negotiating turns.

13. The vehicle of claim 11 wherein said suspension arm includes spring means connecting one said opposed end of said suspension arm to said track support means.

14. A single track vehicle having a main body, a track assembly, a hollow cantilevar suspension arm by which the main body is supported by the track assembly;

said track assembly includes an endless, flexible track means and a track support means; means capturing said track means respective to said track support means for ground supporting the vehicle from the track means;

means by which one end of the suspension arm is connected to the track support means;

the other end of the suspension arm is connected to said main body;

the other end of the suspension arm is connected to said main body;

a motor means is mounted respective to said main body; a drive train means is connected between said motor means and extends through the interior of said suspension arm and into driving relationship respective to said track means; and, a steering system attached to said main body, means extending through the interior of said suspension arm for connecting said steering system to said track means and thereby curving said track means laterally for negotiating turns.

15. The vehicle of claim 14 wherein said track support means comprises a plurality of segments connected together in a manner whereby each segment can be pivoted about a horizontal pivot pin;

means connecting said segments together whereby pivotal movement of one segment causes an adjacent segment to pivot and thereby curve the track support means laterally;

and means forming a tunnel through said segments through which a marginal length of said endless track means is received.

16. A single track vehicle having a main body, a track assembly;

said track assembly includes an endless, flexible track means and a track support means; means by which said main body is supported by the track suppport means; means capturing said track means respective to said track support means for ground supporting the vehicle from the track means; said track means includes a plurality of segments connected together in a manner whereby each segment can be pivoted about a horizontal pivot pin; means connecting said segments together whereby pivotal movement of one segment causes an adjacent segment to pivot;

and means forming a tunnel through said segments through which a marginal length of said endless track is received;

a motor means is mounted respective to said main body; a drive train means is connected between said motor means and extends into driving relationship respective to said track means; and, a steering system attached to said main body and connected to cause the segments to pivot and thereby curve said track means laterally for negotiating turns.

17. The vehicle of claim 16 wherein said means by which said main body is supported by the track support means includes a cantilever arm having opposed ends, one opposed end is attached to said main body and the other opposed end is attached to said track support means.

18. The vehicle of claim 16 and further including a hollow cantilever support arm; said main body is attached to said track support means by said support arm; said drive train means extends through said support arm.

19. The vehicle of claim 16 wherein there is a cantilever arm having opposed ends, one opposed end is connected to said track support means and the other opposed end is connected to said main body; and, spring means interposed between the main body and the track support means.

* * * * *